(No Model.)
L. S. HOWARD.
MILK COOLING AND STRAINING DEVICE.
No. 370,870. Patented Oct. 4, 1887.
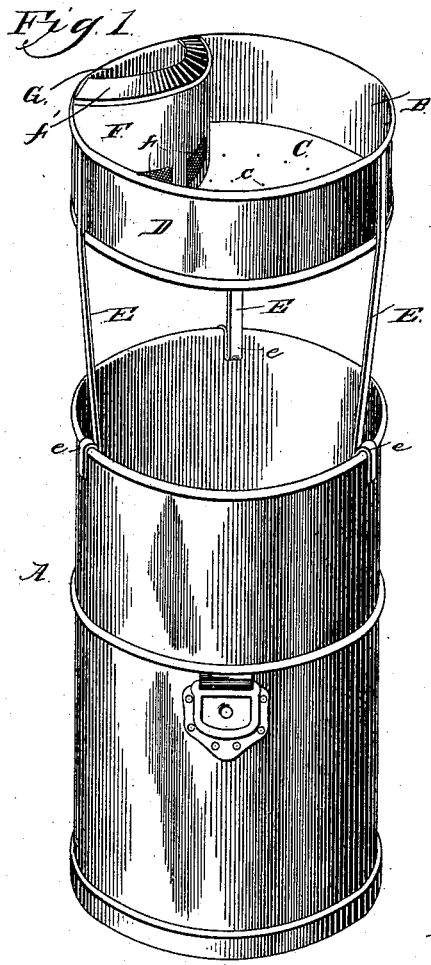
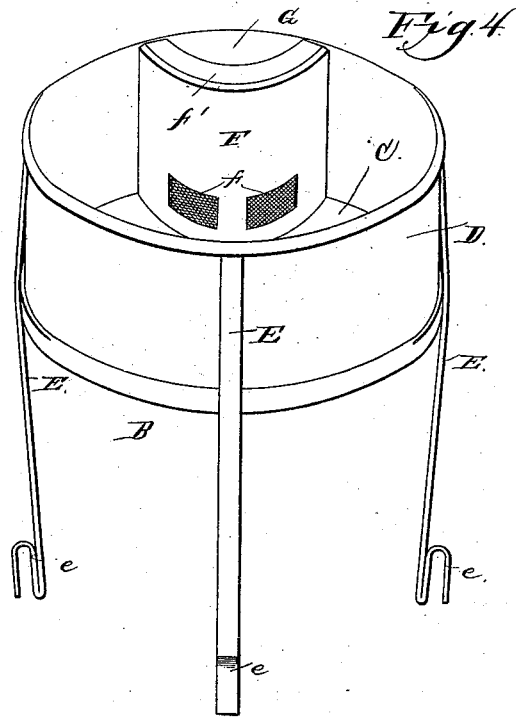
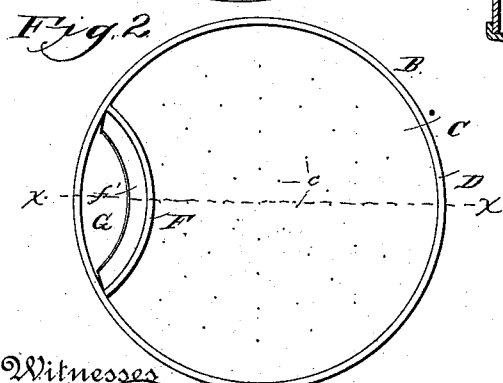
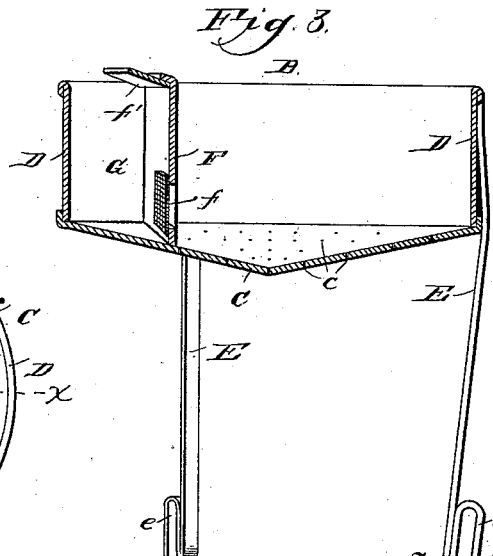
Witnesses
Geo. Shope
E. G. Siggers
Inventor
Leonard S. Howard
By his Attorneys

UNITED STATES PATENT OFFICE.

LEONARD S. HOWARD, OF ALFRED CENTRE, NEW YORK.

MILK COOLING AND STRAINING DEVICE.

SPECIFICATION forming part of Letters Patent No. 370,870, dated October 4, 1887.

Application filed January 26, 1887. Serial No. 225,562. (No model.)

*To all whom it may concern:*

Be it known that I, LEONARD S. HOWARD, a citizen of the United States, residing at Alfred Centre, in the county of Allegany and State of New York, have invented a new and useful Improvement in Milk Cooling and Straining Devices, of which the following is a specification.

My invention relates to an improved device for drawing the natural or animal heat from milk, and thereby reducing the temperature of the milk, so that the purity and sweetness thereof will be preserved.

My invention consists in certain novel features of the device shown in the accompanying drawings, as will be hereinafter fully described, and pointed out in the claims.

In the drawings, Figure 1 is a side elevation of a milk-can having my improved milk-cooler applied thereto in operative position. Fig. 2 is a plan view of the cooler. Fig. 3 is a cross-sectional view of the same, taken on the line $x$ $x$, Fig. 2; and Fig. 4 is a detail perspective view of the cooler.

Referring to the drawings by letter, A designates the milk-can or other suitable receiving-vessel, which may be of any desired size or form.

B indicates my improved strainer, composed of the concavo-convex or dished perforated bottom C and the cylindrical wall or side D. The perforations $c$ in the bottom of the strainer are very small and should not be very close together, the reason for which will be hereinafter set forth. The bottom is made concavo-convex, with the concave side uppermost, so as to direct the milk toward the center thereof. At proper intervals around the side D of the strainer I secure the legs, standards, or props E, which are provided with hooks $e$ at their lower ends, adapted to engage the upper edge of the receiving-vessel and support the strainer over the same. Within the strainer and to one side of the center I erect upon the bottom C a partition, F, which is provided near its lower edge with one or more screens, $f$, and at its upper edge this partition is provided with a lip or guard, $f'$, turned toward the side D.

This being the construction of my device, its operation is as follows: The strainer is supported over the receiving-vessel by engaging the hooks $e$ with the upper edge of the same, as before stated. The milk is then poured into the chamber G, formed by erecting the partition F as above described, and from said chamber it passes through the screens $f$ into the main chamber, from which it passes through the perforations $c$ in the bottom of the same to the receiving-vessel. The perforations being very small, the milk will fall to the receiving-vessel in a number of very fine streams, and as the air plays freely between the receiving-vessel and the strainer the natural heat will be extracted from the milk in its passage from the strainer to the receiver. This extraction of heat is rendered more effective by placing the perforations at some distance apart, as the air will then be enabled to circulate freely between the several streams. The strainers $f$ remove all dirt and foreign matter from the milk, and the guard $f'$ prevents the milk from running over the partition F, and consequently only the clean milk is allowed to pass into the receiving-vessel.

Having thus described my invention, what I claim, and desire to secure by Letters Patent, is—

1. A milk-strainer comprising the perforated dished bottom, the inclosing side walls for the bottom, the partition secured to the side walls above and to one side of the lowest portion of the bottom, the screen located in the partition, and the strainer having depending legs adapted to engage the receiving-vessel and be supported above the same, so as to leave an unobstructed air-space between the said strainer and receiving-vessel, as set forth.

2. A milk-strainer comprising the perforated dished bottom, the inclosing side walls for the bottom, the curved partition secured to the side walls above and to one side of the lowest portion of the bottom, and the screen located at the lower end of the partition, as set forth.

3. A milk-strainer having a perforated bottom and a partition erected thereon, said partition having screens near its lower edge and a lip or guard at its upper edge, substantially as specified.

4. The improved milk-strainer consisting of the cylindrical side or wall, a perforated concavo-convex or dished bottom, a partition erected upon said bottom, and provided with
5 screens near its lower edge and a guard at its upper edge, and legs secured to the side of the strainer, substantially as described and shown.

In testimony that I claim the foregoing as my own I have hereto affixed my signature in presence of two witnesses.

LEONARD S. HOWARD.

Witnesses:
    PELEG THOMAS,
    D. B. LANPHEAR.